Patented Jan. 23, 1940

2,187,819

UNITED STATES PATENT OFFICE 2,187,819

HIGH-MOLECULAR ORGANIC COMPOUND

Karl Koeberle and Otto Schlichting, Ludwigshafen-on-the-Rhine, Germany, assignors to General Aniline Works, Inc., New York, N. Y., a corporation of Delaware No Drawing. Application March 8, 1938, Serial No. 194,614. In Germany February 7, 1936

4 Claims. (Cl. 260—612)

The present invention relates to high molecular organic compounds.

This application is a continuation in part of our copending application Ser. No. 110,280 filed November 11, 1936, which matured into U. S. Patent 2,117,730, May 17, 1938.

We have found that high-molecular compounds of the general formula $R-(A-X)_n$ in which R is the radical of a hydrocarbon having 3 condensed rings and X is an aliphatic radical having at least 4 carbon atoms and $n$ a whole number up to 2 and wherein A stands for —O—, —S— or —Se—, and in which the radical R may contain any further atoms or atomic groups, especially further alkyl groups which may be combined in any desired manner, are distinguished by very valuable properties which render them suitable for many industrial purposes.

The said new compounds may be prepared, for example, by reacting compounds containing the radical of a hydrocarbon having 3 condensed rings with aliphatic compounds having at least 4 carbon atoms, the starting substances being so chosen that either contains at least one hydrogen or metal atom combined with oxygen, sulphur or selenium, and the other an atom or an atomic group which allows the replacement of the said reactive hydrogen or metal atom by the radical of the first mentioned starting compound. More particularly speaking, compounds containing a radical R and atoms or groups capable of being exchanged such as halogen atoms or hydroxyl, alkoxy, nitro or sulphonic acid groups may be reacted with hydroxy, mercapto or seleno derivatives of aliphatic compounds having at least 4 carbon atoms. These aliphatic compounds may also be employed in the form of their salts. Furthermore, hydroxy, mercapto or seleno compounds of hydrocarbons containing 3 condensed rings may be reacted with halogen, hydroxy, alkoxy or nitro compounds of the aliphatic series containing at least 4 carbon atoms. These compounds may also be employed in some cases in the form of their salts. Sometimes it may be of advantage to carry out the preparation of the compounds containing exchangeable atoms or groups serving as starting materials and the conversion of these compounds into the compounds of the present process in one operation.

Another method for preparing the said compounds consists in starting from compounds of the general formula $R'AX$, wherein $R'$ is the radical of a hydrocarbon containing up to 2 condensed rings, and in linking on hydrocarbon rings to the said radical $R'$ until it is converted into the radical of a hydrocarbon containing 3 condensed rings.

Compounds of the kind defined above may also be obtained by reducing compounds of the general composition $R''.A.X$, in which $R''$ is the radical of a carbocyclic compound having 3 condensed rings capable of being reduced. Thus, for example, anthraquinones, phenanthrenequinones which already contain a radical of the composition—A. X, may be converted into compounds of the general formula R. A. X by treating them with zinc dust or sodium hydrosulphite in an alkaline medium, or with stannous chloride in the presence of hydrochloric acid, or with hydrogen iodide, or by treating them with hydrogen under superatmospheric pressure in the presence of hydrogenating catalysts. If desired, this procedure may be combined with the preparation of the starting substances. The reactions are, generally speaking, carried out without the use of a diluent, in some cases, however, it may be useful to employ a suitable solvent or diluent, for example in cases in which one of the starting compounds is comparatively unstable or in which the reactions proceed very rapidly. In some cases the reaction may be carried out with advantage in a closed vessel under superatmospheric pressure.

The reaction products are generally obtained in a good yield and in a good state or purity. If necessary, they may be purified according to the usual methods, for example, by recrystallization, sublimation or redissolution from suitable solvents or by boiling them with solvents or by reprecipitation in stages. They may be employed for most various industrial purposes. They are readily soluble in organic solvents and are distinguished by valuable fastness properties and are in general colored compounds and show often a brilliant fluorescence. They have in part affinity to textile fibres and may therefore be employed as dyestuffs or for the preparation of dyestuffs. Furthermore they may be used for coloring and/or imparting fluorescence to hydrocarbons, rubber or other plastic masses of natural or artificial origin, oils, such as vegetable or mineral oils, especially lubricating oils, fats, waxes and the like.

The following example will further illustrate how our said invention may be performed and carried out in practice, but we do not wish to limit ourselves to the said example. The parts are by weight.

Example

A mixture of 15 parts of 2-hydroxyanthracene, 30 parts of dodecylbromide, 10 parts of potassium carbonate and 30 parts of trichlorbenzene is boiled until unchanged material is no longer detectable. After cooling to about 70° C., the mixture is diluted with 100 parts of methanol and the residue is filtered off by suction and washed with methanol and water. The dodecyl ether of 2-hydroxyanthracene thus formed is a pale yellow crystal powder. By recrystallization from a mixture of monochlorbenzene and ethanol pale yellow crystals are obtained which melt at between 115° and 120° C. The compound dissolves in concentrated sulphuric acid giving a yellow coloration and a green fluorescence. It is also soluble in organic solvents such as benzene, alcohols, acetone and glacial acetic acid giving practically no coloration but a powerful green-blue fluorescence.

In a similar manner 1-hydroxyanthracene may be converted into its dodecyl ether. Also 1.4-dihydroxyanthracene may be converted into the corresponding dodecyl ether. It is also possible to start from the corresponding dodecyl ethers of hydroxyanthraquinones and treating them with reducing agents. Similar compounds are obtained, if other high-molecular alkyl halides are used, as for example octyl bromide, nonyl bromide, octodecyl bromide, octodecyl iodide or octodecenyl bromide. Instead of dodecyl bromide dodecyl chloride may be used.

If the said halogen alkyls are caused to react in a corresponding manner with mercapto or seleno anthracenes, the corresponding thio ethers or seleno ethers are formed. For example 2-mercaptoanthracene and octodecyl bromide yield 2-octodecyl-mercapto-anthracene.

In a manner similar to that described in the first paragraph of this example other hydroxy derivatives or hydrocarbons containing 3 condensed rings may be converted into the corresponding alkyl ethers by reacting them with alkyl halides of the kind mentioned in the preceding paragraphs. For example, hydroxyphenanthrenes or hydroxyfluorenes may be reacted with the said alkyl halides.

What we claim is:

1. A high-molecular compound of the general formula

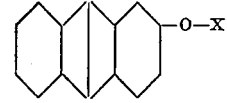

in which X is the radical of an aliphatic hydrocarbon having at least 12 carbon atoms.

2. The anthracene derivative having the formula

in which X stands for the dodecyl radical.

3. The anthracene derivative having the formula

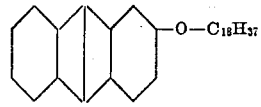

4. The anthracene derivative having the formula

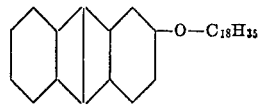

KARL KOEBERLE.
OTTO SCHLICHTING.